US005361216A

United States Patent [19]

Warn et al.

[11] Patent Number: 5,361,216

[45] Date of Patent: Nov. 1, 1994

[54] FLOW SIGNAL MONITOR FOR A FUEL DISPENSING SYSTEM

[75] Inventors: Walter E. Warn, Knightdale; Fred K. Carr, Chapel Hill, both of N.C.

[73] Assignee: Progressive International Electronics, Raleigh, N.C.

[21] Appl. No.: 907,548

[22] Filed: Jul. 2, 1992

[51] Int. Cl.[5] .......................... G06F 15/46; B67D 5/08

[52] U.S. Cl. .................................... 364/510; 364/479; 364/178

[58] Field of Search .................... 364/509, 510, 551.01, 364/465, 178, 478, 479, DIG. 1, 229.41, 229.5; 73/3; 395/275, 325; 141/94, 98

[56] References Cited

U.S. PATENT DOCUMENTS

| | | | |
|---|---|---|---|
| 4,250,550 | 2/1981 | Fleischer | 364/465 |
| 4,550,859 | 11/1985 | Dow, Jr. et al. | 222/26 |
| 5,132,923 | 7/1992 | Crawford et al. | 364/558 |
| 5,208,742 | 5/1993 | Warn | 364/131 |
| 5,270,943 | 12/1993 | Warn | 364/479 |
| 5,299,135 | 3/1994 | Lieto et al. | 364/479 |

FOREIGN PATENT DOCUMENTS 2600318 12/1987 France .

*Primary Examiner*—Thomas G. Black
*Assistant Examiner*—Michael Zanelli
*Attorney, Agent, or Firm*—Fred K. Carr

[57] ABSTRACT

The present invention relates to a flow signal monitoring system for monitoring data signals in a data wire between fuel dispensers and the dispenser controller for collecting, storing, and later down-loading information relating flow quantity signals. The system includes an electronic communication translator which is attached to the wire. The design of the monitoring system is such that it is coupled to the data wire, however, it is electrically isolated from the data wire. When the dispenser and remote dispenser controller are communicating in current loop communication protocol, the system uses a configuration circuit with an opto-coupler having a light emitting diode and transistor for transforming the data signals into corresponding computer logic signals. When the dispenser and controller are communicating in voltage level communication protocol, a comparator is used to transform the data signals into corresponding computer logic signals. The computer logic signals are sent to a microprocessor with read-only memory and read-and-write memory for processing. The system further includes a data field selector which instructs the microprocessor to select and process data fields relating to flow quantity, and to discard all other data signals. Information on the amount of fuel dispensed at each fueling position in the dispenser is stored in memory. This information can be down-loaded to other devices including tank monitors, printer, and display devices.

18 Claims, 6 Drawing Sheets

FLOW SIGNAL MONITOR FOR A FUEL DISPENSING SYSTEM

FIELD OF THE INVENTION

The present invention relates to a device and method for monitoring data signals between fuel dispensers and a remote fuel dispenser controller, and in particular, data signals relating to the amount of fuel dispensed by the dispenser.

BACKGROUND OF THE INVENTION

To provide fuel for the traveling motorist, there are numerous fuel retail outlets located throughout. There has recently been a trend toward the motorist pumping his own fuel at so-called self service fueling sites which offer convenience and lower prices. The self service fueling sites most often have a fuel dispensing system where the dispensers are controlled by a remote dispenser controller. The remote dispenser controller may be located in a building at the site such that the dispensing process is controlled by a site attendant, or it may be a card read system whereby the customer controls the dispensing process.

Generally, a fuel dispenser includes a pump, a fuel supply pipe, a flowmeter, a flow quantity signal generator, a fuel supply hose with nozzle, and a flow indicator. The pump has at one end a pipe connection to a fuel supply tank, and at the other end a hose connection to a fuel supply nozzle. The flowmeter measures the quantity of fuel being pumped, and the flow quantity generator generates a flow quantity signal from the flowmeter. The indicator indicates the quantity of fuel being pumped based on the flow quantity signal.

As previously stated, the dispensers are often controlled by a remote dispenser controller located in a building at the fueling site, or through a card system. The remote controller has a wire connection between the dispensers and controller for transferring data signals. The remote controller generally is a microcomputer based system with read-only-memory (ROM), read-and-write memory (RAM), and input/output ports for reading and storing information applied at the ports. Specific functions of the control systems are well known in the art, and widely used in the industry. The microprocessor based control systems may be in the form of a stand alone console, or in the form of a logic module which interfaces the dispensers to a cash register system, or a card read system. The principles involved are the same, and it is understood that the present invention relates to all such systems.

The dispenser controller sends data signals to the dispensers, and the dispensers send data signals to the controller. Data signals sent to the dispenser from the controller include price per gallon to be charged at corresponding pumps, preset limits to be pumped, and pump authorization. Data signals sent from the dispenser to the controller include pump identity (pump number), pump status, and dispensed fuel volume and value.

In brief, the present invention relates to a flow signal monitoring system for monitoring flow quantity data signals in the data wire without interrupting data signal flow. The flow signal monitoring system is connected to the data wire between the dispensers and controller, and it monitors the data signals without interrupting the communication between the dispensers and controller. All data signals in the data stream are monitored, however, the data signals relating to flow quantity are selected and processed, and all other data signals are discarded. This is accomplished by a data field selector which designates data fields to be selected, and further instructs the microprocessor to select and process designated signals, and to discard all other signals. Information on dispensed volume is stored in memory and can be latter down-loaded to other devices including tank monitoring systems, printing devices, and visual display devices. These are, however, to be taken only as illustrative examples in that data extracted and stored can be used in other ways.

One use for the present invention is in combination with tank monitors. Recent Federal law requires that underground fuel storage tanks be continuously monitored to identify any loses caused by leaks. Tank monitors are used to do this, and are widely used in the industry for this purpose. Tank monitors use a probe which is permanently mounted in the storage tank through a riser pipe. Most tank monitor probes operate on a capacitance principle to sense fuel height. The probe has a wire connection to a microprocessor based control center which processes and stores the information, which usually includes gallons of fuel, inches of water, inches of fuel, temperature of fuel, and ullage.

Tank monitoring systems monitor the amount of fuel in the tank by a probe; the present invention collects and stores information on the actual amount of fuel dispensed from a tank. Thus, the present invention provides a method for reconciling the actual amount of fuel dispensed with the information collected by the tank monitor. The present invention stores actual transactions for each fueling position in memory, and this information can be retrieved at any time for comparison with information taken from the tank monitor.

Another use of the present invention is with inventory control and inventory report preparation. Each fueling position in a dispenser has a mechanical counter for counting the amount of fuel dispensed, and it keeps a running total of these amounts. These values are recorded and displayed on a numbered wheel in the dispenser. It is practice in the industry for the attendant to record these values at the end of his shift. These valves can then be used for shift totals, daily totals, inventory control, and related. For the site attendant to record these values, he must go out to the dispenser and visually observe the numbers from the display and write them down. This can be an inconvenience. For example, if the attendant is alone he must temporarily interrupt all dispensing while he is outside away from the controller. In cold climates, going outside can be uncomfortable. The present invention provides a device from which the site attendant can obtain these values from inside. These values can be visually observed, or they can be printed out.

SUMMARY OF THE INVENTION

In summary, the present invention relates to a flow signal monitoring system for monitoring data signals in a data wire between fuel dispensers and the dispenser controller without interrupting data signal flow in the wire. An electronic communication translator is attached to the wire to be monitored. The design of the monitoring system is such that it coupled to the data wire, however, it is electrically isolated from the data wire. When the dispenser and remote dispenser controller are communicating in current loop communication protocol, the system uses a configuration circuit with an opto-coupler having a light emitting diode and transistor for transforming the data signals into corresponding computer logic signals. When the dispenser and controller are communicating in voltage level communication protocol, a comparator is used to transform the data signals into corresponding computer logic signals. The computer logic signals are sent to a microprocessor with ROM and RAM memory for processing. A data field selector switch instructs the microprocessor to select and process data fields relating to flow quantity, and to discard all other data signals. Information on the amount of fuel dispensed at each fueling position in the dispenser is stored in memory. This information can be down-loaded to other devices including tank monitors, printing devices, and display devices.

The primary object of the present invention is to provide a flow quantity signal monitoring system which monitors data signals in a data wire between fuel dispensers and remote dispenser controller without interrupting data signal flow in the data wire.

Another object of the present invention is to provide a flow signal monitoring system which can monitor data signals between fuel dispensers and remote dispenser controller for collecting and storing information on the amount of fuel dispensed at each fueling position.

A further object of the present invention is to provide a flow signal monitoring system which can be used in combination with a tank monitoring system for reconciling the actual fuel volume dispensed with the information collected by the tank monitor.

A further object of the present invention is to provide a flow signal monitoring system which can be used in combination with a printer for printing the volume of fuel dispensed at each fueling position.

A further object of the present invention is to provide a flow signal monitoring system which can be used in combination with a display device for displaying the volume of fuel dispensed at each fueling position.

Other objects of this invention will appear in the following specification and claims, reference being made to the accompanying drawings which form a part thereof.

DETAILED DESCRIPTION OF THE INVENTION

Figure 1:
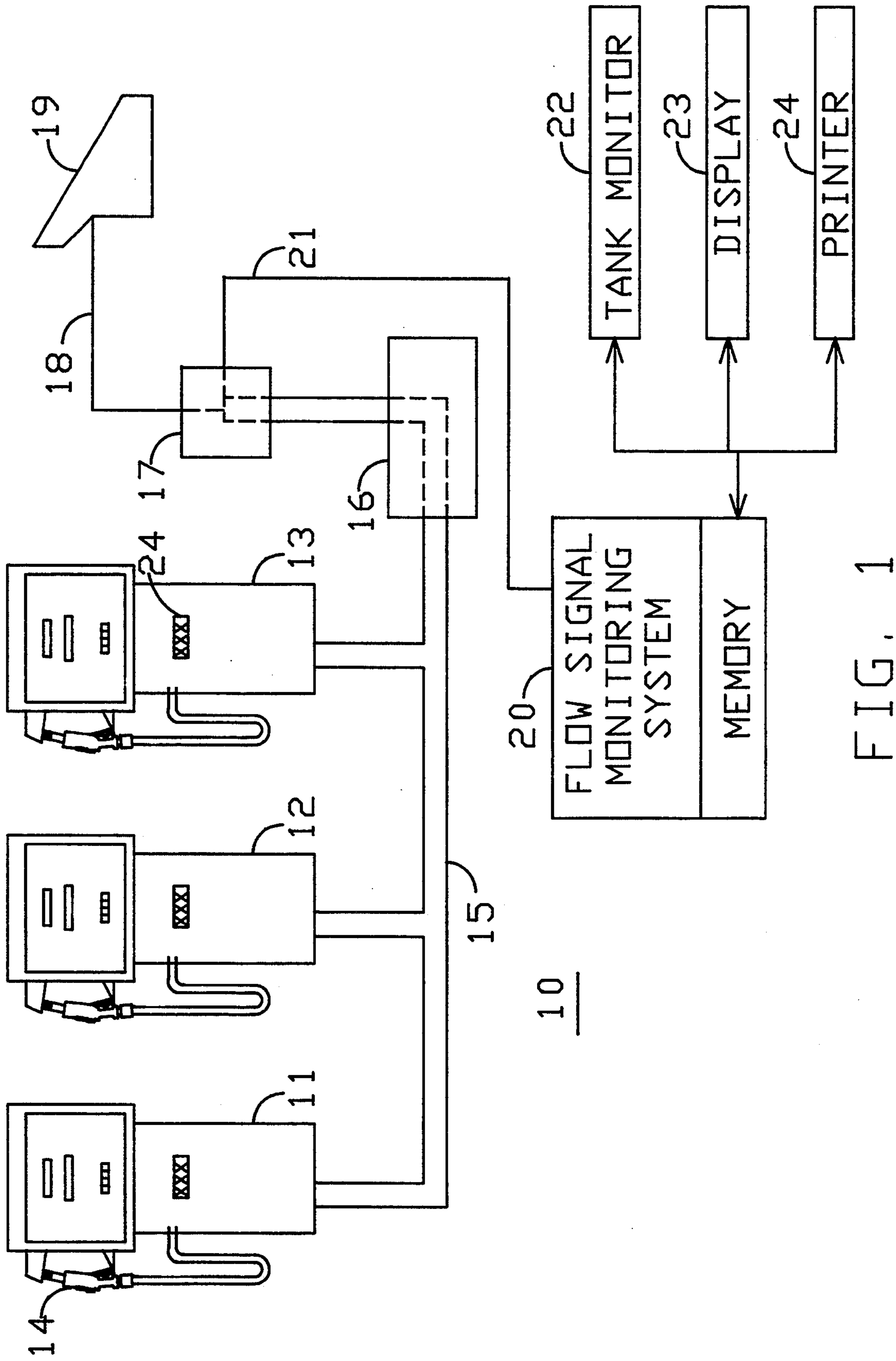
FIG. 1 is a schematic view of a dispensing operation including dispensers, dispenser controller with attachment of the flow signal monitoring system incorporating the principles of the present invention.

Referring now to the drawings, and first to FIG. 1, there is shown a schematic view of a fuel dispensing operation, generally designated (10), with three electronic fuel dispensers (11–13) connected to a remote dispenser controller (19). The dispensers (11–13) and dispenser controller (19) are electrically connected by a data wire (15). The dispenser controller (19) controls the fuel dispensing process at the dispensers (11–13). The data wire (15) is often enclosed in an underground wiring trough (16) for protection. In the illustration, an example of three dispensers is used, however, it is common in the industry to have from two to sixteen dispensers with multiple fueling positions at a fueling site which are controlled by a remote controller. The three dispensers are used for illustration only. It is understood that the present invention has application in any number of multi-product dispensers.

Several types of dispenser control systems are presently used to control electronic and electro-mechanical dispensers, including stand alone consoles, electronic cash registers interfaced to the dispensers through a logic module, and card read systems. Typically on these systems there are a series of input buttons (not shown) on the dispenser controller for entering information on the dispensing process, and a display for displaying information during the dispensing process. Generally, information transferred between the dispensers and controller is in the form of digital data signals. Data signals from the controller (19) to the dispensers (11–13) include price per gallon to be charged at the dispensers, preset amounts of fuel to be dispensed, and pump authorization (i.e., an activated mode where the pump will dispense fuel when the customer opens a valve in the pump nozzle). Data signals sent from the dispensers (11–13) to the controller (19) include pump number, pump status, and dispensed fuel volume and value for each fueling position.

Referring further to FIG. 1, it can be seen that the flow signal monitoring system FSMS (20) is attached to the data wire (15) such as to monitor the data signals. In the illustration, the dispensers (11–13) and the dispenser controller (19) are communicating in current loop, and the FSMS (20) is connected to the data wire (15) through connection (21) in the distribution box (17). When the dispensers and controller are communicating in voltage level, later discussed, the connection is in the controller cable (18). The FSMS (20) monitors the communication, i.e. data stream, between the controller (19) and dispensers (11–13) without interfering with the flow of data signals in the wire (15). In essence, the FSMS (20) is coupled to, but electrically isolated from, the data wire (15) through a configuration circuit, later discussed. Data signals relating to dispensed fuel volume are selected, processed, and stored in memory, other data fields are discarded.

During a dispensing operation, a customer pulls his vehicle along side one of the dispensers and removes the nozzle (14) from the dispenser. The dispenser is authorized, or enabled, by the dispenser controller; enabling occurs by activating relay contacts in the pump. When the pump is activated, it dispenses fuel when the customer opens the valve in nozzle (14). Each fueling position in a dispenser has a mechanical counter for counting the amount of fuel dispensed, and it keeps a running total of these amounts. The values are recorded by a mechanical totalizer and displayed on a numbered wheel (24) in the dispenser.

As fuel is dispensed, a pulse signal is generated by a pulser in a conventional manner. The pulses are transferred to a processing unit (not shown) in the dispenser head, which is connected to the dispenser controller (19) through data wire (15). The FSMS (20) monitors the fuel flow quantity signal as it is being transmitted from the dispenser to the controller. This information is stored in memory, and can be later down-loaded to other systems including a tank monitor (22), a display device (23), and printing device (24).

Figure 2:
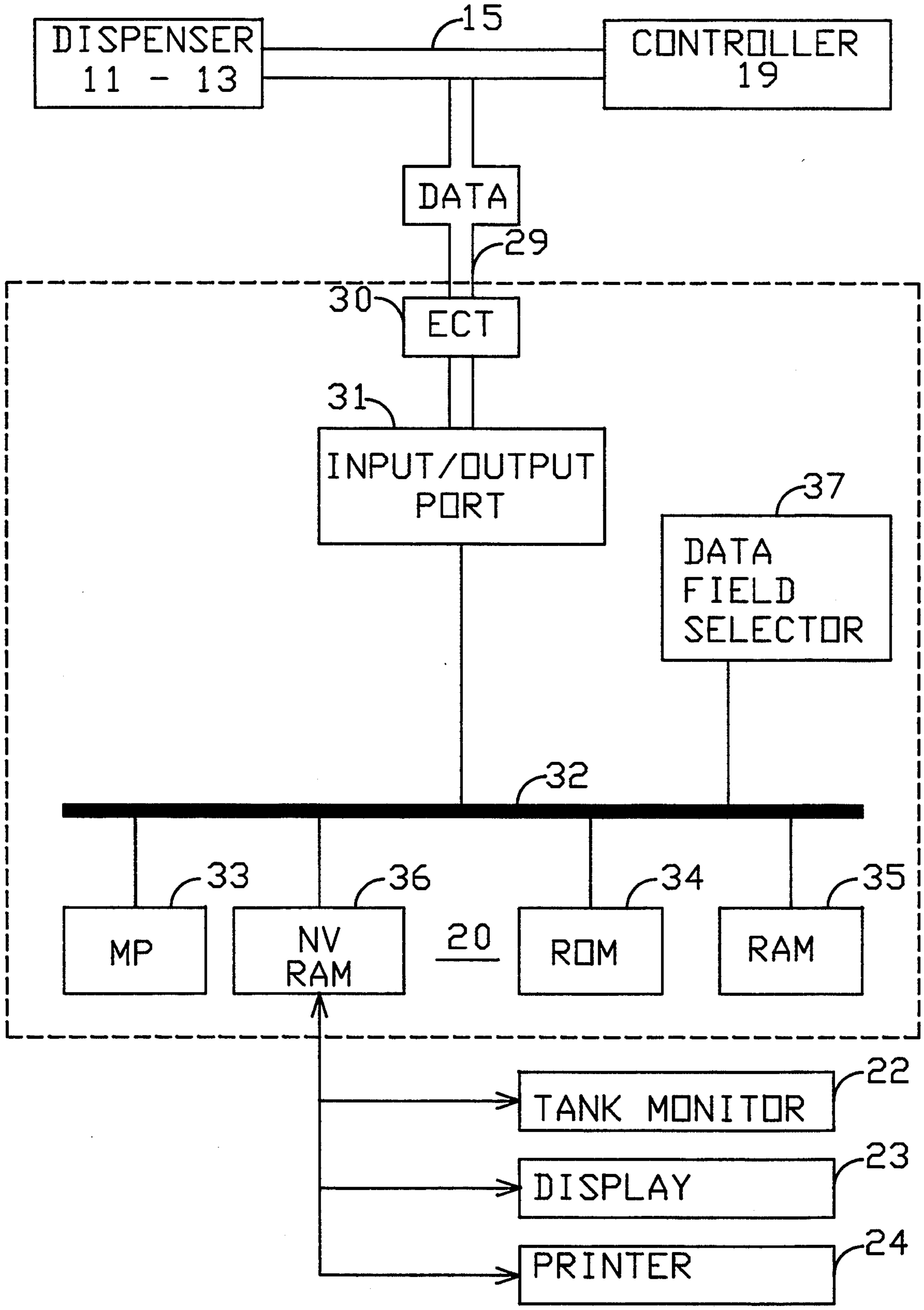
FIG. 2 is a schematic depiction of the components of the flow signal monitoring system with connection to other devices to which stored information can be down-loaded.

Referring now to FIG. 2, there is shown a diagram of the components of the FSMS, generally designated (20), with attachment to the data wire (15). In general, the FSMS (20) includes an electronic communication translator ECT (30), a microprocessor MP (33) with read-only-memory ROM (34) and read-and-write memory RAM (35), a data field selector (37), and a memory device (36) for storing information on the quantity of fuel dispensed. These are commonly connected through common data bus (32).

The ECT (30), which is in essence, a configuration circuit, is connected to the data wire (15) between the dispensers (11–13) and dispenser controller (19); the connection may be in series or parallel. The ECT (30) allows the data current to monitored without interrupting communication between the dispensers and controller. The ECT (30) couples the data wire to the FSMS (20), while at the same time it electrically isolates the two. The ECT (30) translates the dispenser-controller digital data signals into computer logic signals which are sent to the MP (30) for reading. The ECT (30) is connected to the MP (33) through an input/output port (31). The input-output port includes URAT chips for sending interrupt signals through bus connection (32) to MP (33).

The MP (33) in the FSMS (20) operates in a conventional manner. Specific implementations of the MP (33) are well known to those skilled in the art, and include for example, integrated circuits manufactured and sold by INTEL (model 9135 KC). The MP (33) is functionally connected to a ROM chip (34), and RAM chip (35). Program control for the MP (33) is stored in ROM, and is set forth in flow chart form in FIG. 6. The computation programs are stored in RAM, and is set forth in flow chart form in FIG. 6. Once the information on the amount of fuel dispensed at each fueling position has been processed by the MP (33), it can be stored generally in any storage device. In the illustrative example, storage is in a non volatile read-and-write memory chip NVRAM (36) such that stored information will not be lost if power is lost. The information can also be stored in the system operating RAM (35), or it could be transmitted to storage devices exterior to the FSMS (33) circuit board.

A data field selector (37) is connected to the MP (33) through bus (32). As previously discussed, the data stream presented to the MP (33) include signals from the dispenser controller to the dispensers including price per gallon, preset limits of fuel to be dispensed, and pump authorization; data signals from the dispensers to the controller include pump number, pump status, and the fuel dispensed. The data stream may be in byte protocol form or bit protocol form. The data field selector (37), in essence, provides a method for parsing the data stream. The data field selector (37) instructs the MP (33) as to which data fields to process, and which data fields to discard. In the present invention, the data field selector board (60), seen in FIG. 5, instructs the MP (33) to select and process computer logic fields which correspond to data fields relating to fuel flow, and to discard all other data fields.

Different commercial dispenser manufacturers use a unique communication protocol for communication between their dispensers and controller. The two most widely used are current loop and voltage level. With current loop, there is a wire running from the distribution box to each dispenser and back to the distribution box forming a loop (serial topographic arrangement). An example is shown in FIG. 1. With voltage level, there is a wire pair running from a site controller to each dispenser, i.e., a parallel topographic arrangement.

An advantage of the present invention is that it can monitor the data signals in different commercial brands of dispensers, and different dispenser models within a commercial brand. This is done by a configuration circuit in the ECT (30). For this discussion, illustrative examples of current loop and voltage level communication are used. It is understood that the configuration circuit in the ECT (30) can be adapted for other types of communication between the dispensers and controller.

Figure 3:
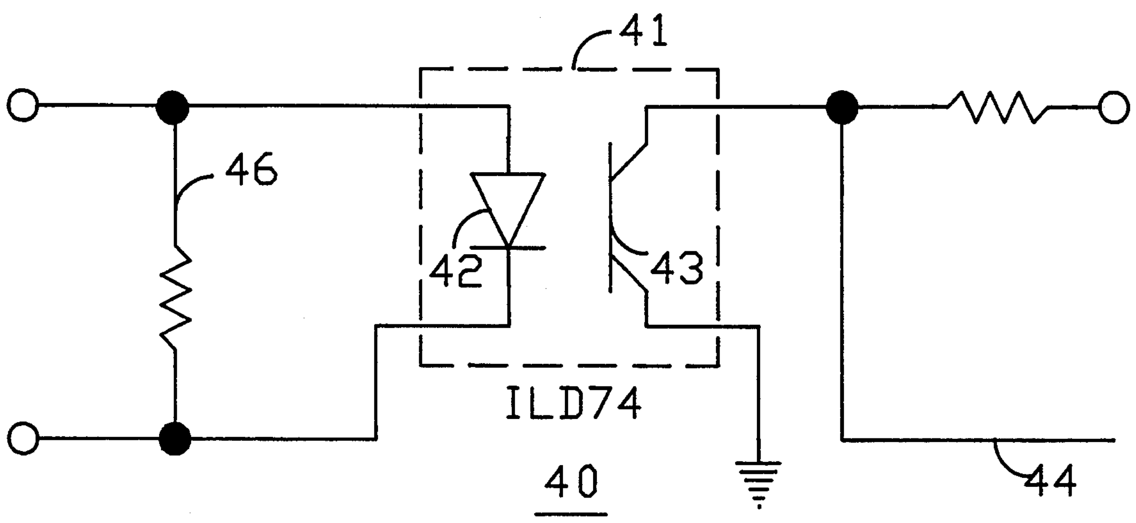
FIG. 3 is a schematic diagram of an opto-coupler as used in the configuration circuit of the present invention.

Referring now to FIG. 3, there is shown a schematic diagram of a current loop configuration circuit, generally designated (40), as used in the ECT (30) when the dispensers and controller are communicating in current loop. The configuration circuit (40) converts the dispenser-controller digital data signals into computer logic signals which are presented to the input-output port (31), and then to the MP (33). The configuration circuit (40) includes an opto-coupler (41) which is connected to the data wire (15) for monitoring the data signals. The configuration circuit (40) has a resistor (46) which allows one to adjust the amount of current flowing into the circuit. The opto-coupler converts the data signals into a computer logic data stream which is readable by the MP (33), for example, transistor-transistor logic TTL signals. The computer logic data stream corresponds to the digital data stream in the data wire. The opto-coupler (41) samples the data flow through the light emitting diode (42), and this information is transferred to the transistor (43). The transistor (43) generates signals in, for example, TTL form for presentation to the MP (33) through input/output port (31), shown in FIG. 2. During operation, the transistor (43) may, for example, apply five volts to the MP (33) through connection (44) for a high signal bit, and zero volts for a low bit signal; other voltages can be used. The configuration circuit (40) has a conventional band rate output chip, not shown, with connection to the input-output port (31) for synchronizing signal flow. Depending on the hardware arrangement, other types of computer logic including CMOS, NMOS, and related can be used.

Figure 4:
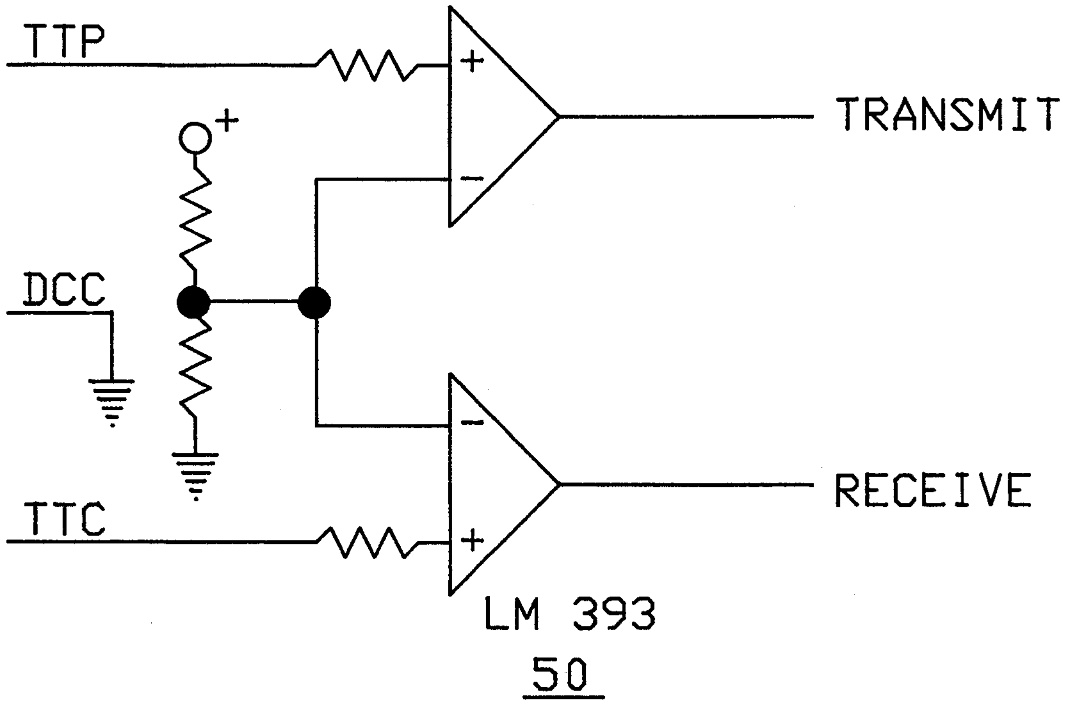
FIG. 4 is a schematic diagram of an comparator as used in the configuration circuit of the present invention.

The design of the communications translator depends on the type communication between the dispensers and controller. Referring now to FIG. 4, there is shown a comparator, generally designed (50), as used in the ECT (30) when the dispensers and dispenser controller use voltage level communication. With voltage level, the dispenser-controller communicate through voltage differential in a wire pair running from a site controller to each dispenser. Commercially available model LM 393 is an illustrative example of a comparator as used in the present invention.

Figure 5:
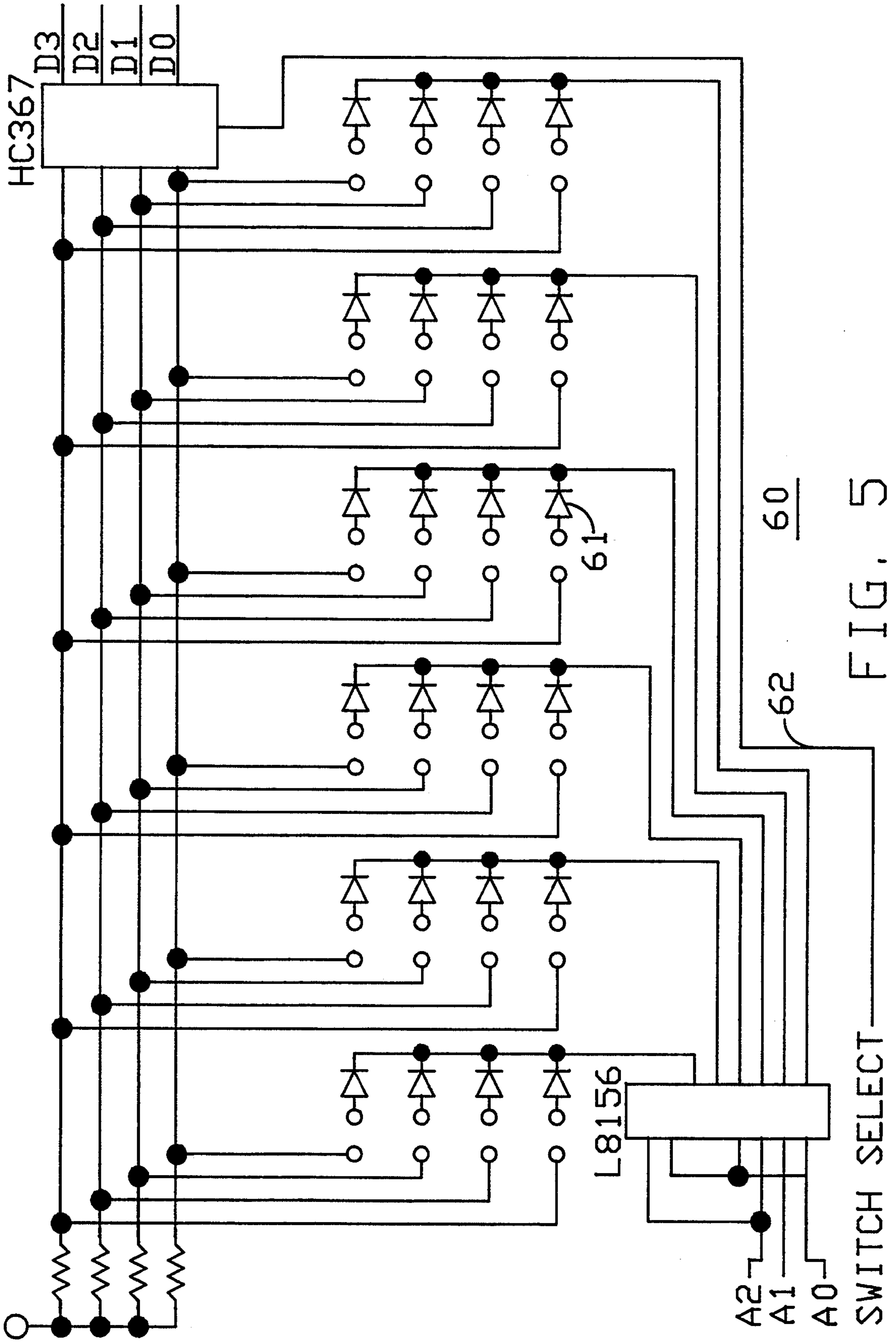
FIG. 5 is a schematic diagram of the data field selector for designating data fields in the present invention.

Referring now to FIG. 5, there is shown the data field selector board, generally designated (60). As previously discussed, there are several data signal fields flowing between the dispensers (11–13) and dispenser controller (19). These signals are converted by the ECT (30) into computer logic signals for presentation to the MP (33). The data field selector (60) understands the communication protocol of the data signals, and is programmed to cause the MP (33) to parse the computer logic data stream such as to select and process certain data field, and to discard all other data fields. The data field selector (60) is a matrix of diodes, as example (61), forming in essence a configuration board. The data field selector board (60) communicates with MP (33) through an address bus (A–A2), and a reader bus (D–D3). In the present invention, the dispenser-controller data signal fields selected and processed are pump number, pump status, and the amount of fuel dispensed by these, which in combination form the flow quantity signal. The data field selector (60) causes the MP to parse the data stream selecting these fields, and discarding all other fields. The MP (33) is further connected to the data field selector board (60) through switch select (62).

Figure 6:
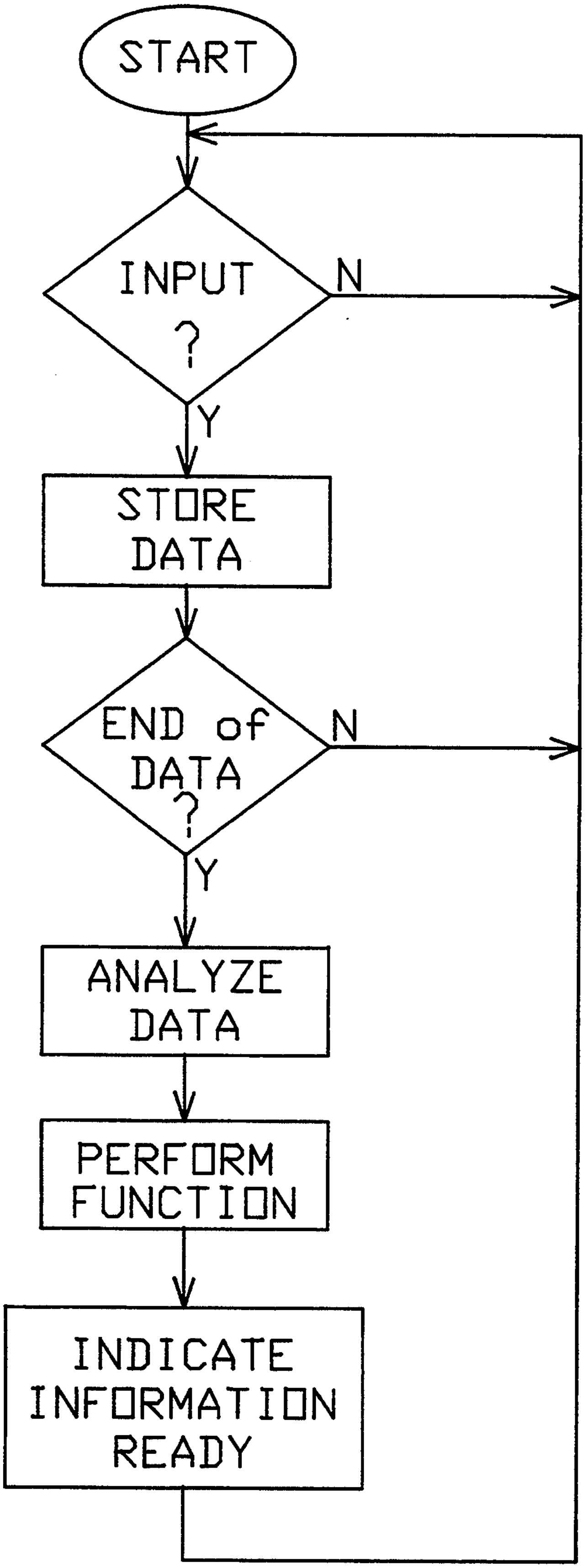
FIG. 6 is a flow chart demonstrating the overall system processing for the flow signal monitoring system.
Figure 7:
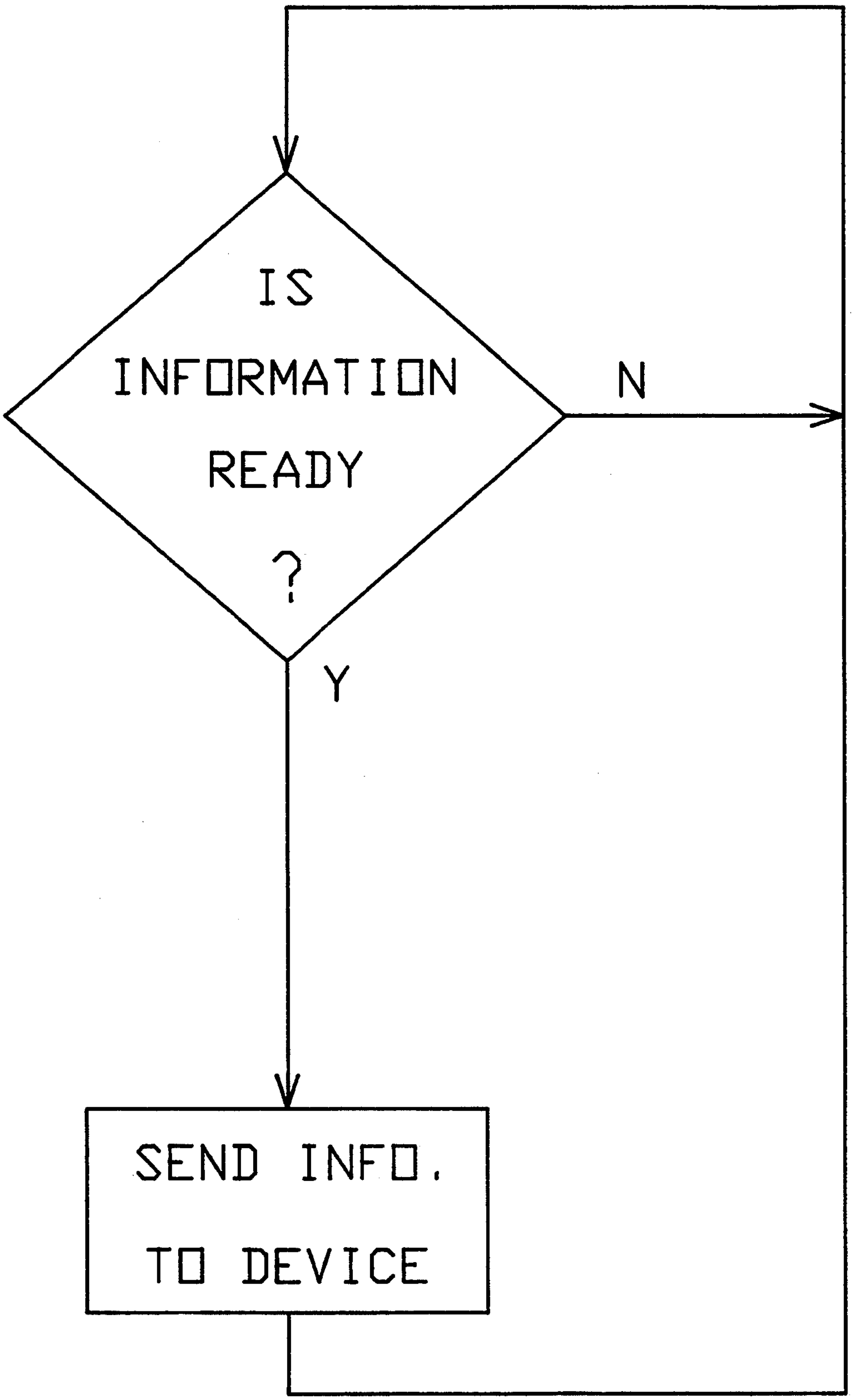
FIG. 7 is a flow chart for demonstrating the down-loading of information from memory to another device.

Referring now to FIGS. 6 and 7, there are shown flow charts for program processing contained in ROM (34) and RAM (35) of the FSMS (20). When data is presented, the data is stored until the end of data presentation. Thereafter, the data is analyzed and the function performed. As an example, a customer pulls up to a dispenser, for illustration, say fueling hose designated number 3. He removes the nozzle, and inserts it in the fuel tank. The dispenser is authorized, and the customer squeezes the nozzle trigger. When the fuel starts to flow, the dispenser sends to the dispenser controller the following; hose number 3 (pump number) is pumping (pump status) along with a continuous update on the amount dispensed, which forms the flow quantity signal. When the customer has finished pumping, a signal is send indicating that hose number 3 is now idle. The total amount dispensed is calculated, and put in memory (totalizer) such that there is a running total of fuel dispensed by hose number 3. The same information is kept for each hose (fueling position) in the fueling network. At request this information can be taken from memory and transferred to the device requesting the information, or the memory can be associated with a clock such that the information is down-loaded at pre-programmed times.

During operation, the stored information on fuel dispensed is best down-loaded when all dispensers are idle. This provides a "snap shot" of all activity at each fueling position on a real time basis. Referring to FIG. 7, there is shown a flow chart for this. When the information is requested, or is to be down-loaded at a preset time, the information is transmitted under these conditions.

Having discussed above the operation of the flow signal monitoring device (20), attention is now directed toward examples of usage at a fueling facility. An important feature of the present invention is that it can be used with different commercial brands of dispensers communicating in different communication protocols. By monitoring the data signals, actual fuel transactions are extracted and totals for each fueling position stored in memory. This information can be displayed by a display device mounted on the FSMS (20) housing, or it can printed through a printer port coupled to the system. In addition, it can be transmitted through a communication interface, as examples RS-232 and RS-485 ports, to an on-site computer at the fueling facility, or over telecommunications lines to a host computer at headquarters. In essence, once this information has been collected and stored, there are a number of existing technologies which would allow the information to be used on site, or transmitted to remote locations.

As previously discussed, tank monitors are widely used in the industry to monitor fuel storage tanks by a probe. The present invention can be used in combination with a tank monitor to reconcile the actual amount of fuel dispensed from a tank with the information collected by the tank monitor. Presently existing tank monitors have either: a processing unit built-in, are associated with a separate computer at the fueling site, or are coupled to host computing system at a remote location through a telecommunications lines. It is understood that the present invention can down-load information to each of these arrangements. RS-232 and RS-485 ports can be used for interfacing the FSMS (20) to the tank monitor. In addition, the information can be down-loaded at request, or the memory device can be associated with a clock (commercially available from Dallas Semiconductor) for causing the information to be transmitted at a pre-set time.

As also previously discussed, each fueling position in a fuel dispenser has a mechanical counter for keeping a running total of fuel dispensed. There is a mechanical display, or numbered wheel, in each dispenser for displaying the amount of fuel dispensed from each fueling position. The totals are from when the display was first set to zero, i.e., a running total. These totals are widely used in inventory control. It is common practice to have the site attendant write down these totals at the end of his shift for inventory and record keeping. To do this, he must go outside to the dispensers, and write down the numbers.

The present invention can be used to collect and store the same information from inside. This information can be displayed or printed from inside the facility, or it can be transmitted over communication lines to remote host computers. When the FSMS (20) is installed in an existing facility, the memory in the FSMS (20) can be set to correspond with the existing values in the mechanical totalizer in the dispenser. Thereafter, the numbers displayed or printed from the FSMS (20) are the same as those in the dispenser, thereby, providing a method for obtaining these numbers without going outside. The values in the memory of the FSMS (20) can be set by an input keypad coupled to the MP (33). As stated above, these numbers are set to correspond to those in the dispenser when the FSMS (20) is installed.

In one embodiment of the present invention, a liquid crystal display and input key pad are mounted on the top of box housing the flow signal monitoring system circuit boards. Liquid crystal displays and keypad are widely used for other applications, and commercially available. The commercially available liquid crystal is coupled to the MP (33) in the FSMS (20), and displays totals from memory when activated. The system can also be equipped with a printer port for coupling to a printer. The information in memory is down-loaded through the port to the printer when a hard copy is desired.

The above described invention relates to a method and device for monitoring data signals in a data wire between a dispenser and dispenser controller such that information on the amount of fuel dispensed is extracted and stored. While the invention has been described in the manner presently conceived to be most practical and a preferred embodiment thereof, it will be apparent to persons ordinarily skilled in the art that modifications may be made thereof within the scope of the invention, which scope is to be accorded the broadest interpretation of the claims such as to encompass all equivalents, devices, and methods.

What is claimed is:

1. A flow signal monitoring system having a microprocessor for monitoring a digital data stream in a data wire between at least one fuel dispenser and a dispenser controller, wherein said data stream includes a plurality of data fields including one data field comprising a command code, pump number, pump status, and dispensed fuel volume and a value containing information on the amount of fuel dispensed from each fueling position which is collected and stored for down-loading to a display, a printer, or tank monitor; comprising:

(a) an electronics communication translator means, connected to said data wire between said at least one fuel dispenser and said dispenser controller, for converting said data stream into a computer logic data stream having corresponding data fields including information on the amount of fuel dispensed from each fueling position;

(b) a microprocessor including plural input-output ports, programmable read only memory, programmable read and write variable memory, said microprocessor having bus means connecting said communication translator with at least one of said microprocessor ports for receiving said computer logic data stream;

(c) a programmable data field selector means, having bus connection to at least one of said microprocessor ports, for instructing said microprocessor to recognize, select and process said corresponding data fields containing information on the amount of fuel dispensed from each fueling position, and to discard all other data fields; and (d) a memory means, coupled to said microprocessor, for receiving and storing information on the amount of fuel dispensed from each fueling position.

2. A flow signal monitoring system as recited in claim 1, wherein: said communication translator means uses an opto-coupler means including a light emitting diode and transistor for converting said data stream into said computer logic data stream.

3. A flow signal monitoring system as recited in claim 1, wherein: said communications translator means uses a comparator means for converting said data stream into said computer logic data stream.

4. A flow signal monitoring system as recited in claim 1, further comprising: a communication interface means, coupled to said microprocessor and said memory means, for down-loading stored information on the amount of fuel dispensed from each fueling position to said tank monitor.

5. A flow signal monitoring system as recited in claim 1, further comprising: a communications interface means, coupled to said microprocessor and said memory means, for down-loading stored information on the amount of fuel dispensed from each fueling position to said printer.

6. A flow signal monitoring system as recited in claim 1, further comprising: a communications interface means, coupled to said microprocessor and said memory means, for down-loading stored information on the amount of fuel dispensed from each fueling position to said display.

7. A flow signal monitoring system as recited in claim 6, wherein: said display is a liquid crystal display means for displaying the amount of fuel dispensed.

8. A microprocessor controlled method for collecting and storing information on an amount of fuel dispensed from each fueling position in at least one fuel dispenser, utilizing a data line monitor to monitor a data stream in a data wire between said at least one fueld dispenser and a dispenser controller wherein said data stream includes a data field comprising command code, pump number, pump status, and dispensed fuel volume and a value containing information on the amount of fuel dispensed form each fueling position, comprising the steps of:

(a) feeding the data stream in the data wire between said at least one fuel dispenser and dispenser controller into an electronics communication translator means for converting said data stream into a corresponding computer logic data stream including a computer logic data field containing information on the amount of fuel dispensed from each fueling position;

(b) feeding said computer logic data stream to an input-output pin of a microprocessor having programmable read only memory and program/nable read and write memory;

(c) coupling said microprocessor to a data field selector means for instructing said microprocessor to recognize, select and process said computer logic data field containing information on the amount of fuel dispensed from each fueling position, and to discard all other data fields;

(d) storing information on the amount of fuel dispensed from each fueling position in a memory means for keeping track of the amount of fuel dispensed from each fueling position in said at least one fuel dispenser;

(e) down-loading said information on the amount of fuel dispensed from each fueling position from said memory means through a communications interface means to a second device for transferring said information so that said second device now has information on the amount of fuel dispensed from each fueling position in said at least one fuel dispenser.

9. The method as recited in claim 8, wherein: step (a) is practiced by using an opto-coupler means in said communications translator means for converting said data stream into said computer logic data stream.

10. The method as recited in claim 8, wherein: step (a) is practiced by using a comparator means in said communications translator means for converting said data stream into said computer logic data stream.

11. The method as recited in claim 8, wherein: step (e) is practiced by down-loading said information on the amount of fuel dispensed form each fueling position through said communications interface means to a computing element in said tank monitor for reconciling the actual amount of fuel dispensed from each fueling position with information collected by said tank monitor.

12. The method as recited in claim 8, further comprising the step of: coupling a programmable clock means to said microprocessor and said memory means for instructing step (e) to be carried out at a pre-programmed time.

13. The method as recited in claim 8, wherein: step (e) is practiced by down-loading said information on the amount of fuel dispensed from each fueling position through said communications interface means to a liquid crystal display means for displaying said information.

14. The method as recited in claim 8, wherein: step (e) is practiced by down-loading said information on the amount of fuel dispensed from each fueling position through said communications interface means to a printer for printing said information.

15. A method for operating a microprocessor for collecting, storing, and transmitting information on an amount of fuel dispensed from a fuel dispenser with a flow signal monitoring system, connected to a data wire between the fuel dispenser and a dispenser controller wherein said data wire conducts a data stream including data fields with information on the amount of fuel dispensed from each fueling position on said fuel dispenser, including a communications translator for converting the data fields in said data stream in said data wire into a computer logic data stream including computer logic data fields with information on the amount of fuel dispensed from each fueling position and a data field selector for instructing the microprocessor to select and process said computer logic data fields with information on the amount of fuel dispensed from each fueling position and to discard all other data fields, wherein the information on the amount of fuel dispensed is downloaded to a tank monitor, comprising the steps of:

(a) receiving from said communication translator said computer logic data stream corresponding to the data stream in said data wire between said dispenser and said dispenser controller;

(b) receiving from said data field selector a selector signal including instructions to select data fields with information on the amount of fuel dispensed from each fueling position;

(c) parsing said computer logic data stream for selecting and processing data fields with information on the amount of fuel dispensed from each fueling position, and discarding all other data fields;

(d) storing the information on the amount of fuel dispensed from each fueling position in a memory chip.

16. A method of operating a microprocessor for collecting, storing, and transmitting information on the amount of fuel dispensed as recited in claim 15, further comprising the step of: transmitting the stored information on the amount of fuel dispensed from each fueling position from said memory chip through a communications interface to said tank monitor.

17. A method of operating a microprocessor for collecting, storing, and transmitting information on the amount of fuel dispensed, as recited in claim 15, further comprising the step of: transmitting the stored information on the amount of fuel dispensed from each fueling position at pre-programmed times, wherein said memory chip is coupled to a programmable clock means for instructing the stored information to be down-loaded through a communications interface at pre-programmed times, to said tank monitor.

18. A flow signal monitoring system having a microprocessor, used in combination with a tank monitor, for monitoring data signals in a data wire between at least one fuel dispenser and a dispenser controller without interrupting data signal flow in the data wire, where said data wire conducts a data stream including information on the amount of fuel dispensed form each fueling position in said at least one fuel dispenser which is collected, stored, and later down-loaded to the tank monitor for reconciling the amount of fuel dispensed with the information collected by the tank monitor, comprising:

(a) an electronics communications translator means, connected to said data wire, for translating the data signals in said data stream into a computer logic data stream having data fields corresponding to said data signals in said data wire such that data signal flow in said data wire is not interrupted;

(b) a microprocessor having plural input-output ports, programmable read and write only memory, programmable read and write variable memory, said microprocessor having a bus connecting said communication translator with at least one of said microprocessor ports for receiving said computer logic data stream;

(c) a programmable data field selector means having a bus connection to at least one of said microprocessor ports for instructing said microprocessor as to which of said data fields in said data stream to select and process, and which of said data fields to discard, wherein said data field selector means instructs said microprocessor to parse said computer logic data stream for selecting and processing data fields with information on the amount of fuel dispensed from each fueling position, and to discard all other data fields;

(d) a memory means having a bus connection to at least one of said microprocessor ports for storing information on the amount of fuel dispensed from each fueling position;

(e) a communications interface means, coupled to said memory means and further coupled to said tank monitor, for down-loading said information on the amount of fuel dispensed from each fueling position at request to said tank monitor.

* * * * *